United States Patent [19]
Robinson

[11] 3,937,871
[45] Feb. 10, 1976

[54] CODE COMMUNICATION

[75] Inventor: Alfred Henry Robinson, London, England

[73] Assignee: International Publishing Corporation Limited, London, England

[22] Filed: Mar. 26, 1973

[21] Appl. No.: 344,765

[52] U.S. Cl. ............... 178/6; 178/DIG. 3; 325/38 B
[51] Int. Cl.² ..................... H04N 7/12; H03K 13/22
[58] Field of Search .......... 178/DIG. 3; 179/15 AP, 179/15 BW, 15.55 R; 325/38 R, 38 A, 38 B

[56] References Cited
UNITED STATES PATENTS

| | | | |
|---|---|---|---|
| 3,071,727 | 1/1963 | Kitsopoulos | 178/DIG. 3 |
| 3,394,352 | 7/1968 | Wernikoff et al. | 178/DIG. 3 |
| 3,560,639 | 2/1971 | Centanni | 178/DIG. 3 |
| 3,769,453 | 10/1973 | Bahl et al. | 178/DIG. 3 |

OTHER PUBLICATIONS
"Adaptive Data Compression Scheme," H. Kobayashi, IBM Technical Disclosure Bulletin, Vol. 14, No. 4, Sept. 1971, pp. 1305-1311.

Primary Examiner—George H. Libman
Assistant Examiner—Marc E. Bookbinder
Attorney, Agent, or Firm—Brisebois & Kruger

[57] ABSTRACT

A method and apparatus for code communication is disclosed in order to achieve band-width compression. Successive portions of information are derived and the next portion of information is predicted from at least one preceding portion, an error signal is then generated corresponding to the difference between the predicted portion and the next actual portion of information, whereafter the error signal is coded for transmission to a receiving device. The system is particularly described for coding two level signals derived from a facsimile transmitter, e.g., by the scanning of text or pictures.

3 Claims, 9 Drawing Figures

LEGENDS AS FOR FIG.7

CODE COMMUNICATION

The present invention relates to a method and apparatus for code communication in order to achieve bandwidth compression.

BACKGROUND OF THE INVENTION

In many communication systems the data to be transmitted has its own characteristic statistical structure. The most efficient transmission of such data can be accomplished by designing an optimum code that is matched to this statistical structure. The maximum saving in channel capacity can be calculated from the statistical nature of the data by Shannon's Theorem.

Shannon's Theorem treats an information source as sequences of symbols that may be regarded as random samples from a homogeneous population with known and fixed frequency distributions of all orders (i.e., for single symbols, pairs of symbols, triplets of symbols, ... $n$-tuples of symbols). The term homogeneous implies that any sufficiently long sequence is likely to be typical of the population source and therefore representative of any other source sequence.

Prior-art coding and compression systems have been proposed which use matched codes in a manner suggested by Shannon's Theorem, but these have been disappointing in their performance because they did not take Shannon's idea far enough. In many communication systems the populations often have numerous very long-range dependencies between samples that are difficult to measure adequately, let alone take into account with an optimum code. This applies particularly to information sources obtained by scanning systems in which the image being scanned leads to dependencies between adjacent elements in the scanning direction and orthogonal to it.

Furthermore, in such situations (e.g., for elements of television or facsimile signals), these significant dependencies between samples spaced far apart in the signal obtained by scanning require that a "sufficiently long" sequence for direct application of Shannon's Theorem be impracticably long.

The present invention is directed particularly to code communication for signal sources resulting from scanning systems, but it should be understood that various novel features are herein described which can be used either separately or in combination and with advantage in a variety of bandwidth compression systems. It should also be understood that the term bandwidth compression is used herein to describe, alternatively or in conjunction with, time compression or storage saving systems.

Again, primarily for purposes of illustration, the system to be hereinafter described refers to a facsimile system in which the scanner source is a rotating drum, and in which the signal source consists of binary sequences. However, it is to be understood that suitable modifications would enable systems to be constructed in which a CRT or other type of scanner is used, or in which no scanners at all are used, and that systems could be constructed in which the signal source consisted of sequences of samples having more than two possible values.

SUMMARY OF THE INVENTION

The invention provides a method and apparatus for producing information in coded form comprising means for accepting successive portions of information, means for predicting the next portion of information from at least one preceding portion, means for generating an error signal corresponding to the difference between a predicted portion and the next actual portion of information and means for coding the error signal for transmission to a receiving device. Preferably the prediction is effected from a comparison of at least two preceding portions of information. The error signal may be treated, prior to transmission, by removing redundant information related to the similarity of successive portions of information sampled.

The successive portions of information may comprise successive contiguous scans across information to be communicated, e.g., successive scans of a television or facsimile system. The successive scans are each stored in a separate storage device, the storage devices feeding the prediction means, whose output is compared with the signal representing the actual next scan to produce the error signal. This latter signal is applied to a plurality of parallel coders which are so arranged and organised that the coder producing the most efficient coding of the information at any time is employed.

In one embodiment each portion of information will generate a signal in analogue form which in turn is converted into digital form, e.g., binary form, and may be in the form of run length counts which are stored in the storage devices.

In another embodiment each portion of information is derived in digital form, as for example in certain multiplex telemetry systems.

The error signals produced have a statistical structure which can be treated by constructing a code to match it. By constructing a plurality of different coding devices each matched to one of the populations contributing to the information source formed by the error signal, bandwidth compression can be achieved. Each coded output is temporarily stored in a buffer store. The coders ae fed in parallel with the error signal and that coder which at any time produces fewer coded output signals than the other coders, i.e., which is most closely matched to the statistical structure of the error signal being handled at that time, is the coder whose output it is most advantageous to employ.

If one coder continues to perform better than the others, its buffer store will eventually fill and the operation is such that the coders are then stopped, the buffer store of that coder is emptied into an output store, all the coders are cleared and the coding and buffer storage process is then resumed.

However if the statistical structure of the error signal changes so that another coder becomes more efficient than the first coder, then the output store is caused to accept an optimum combination of data from the buffer stores of these two coders.

BRIEF DESCRIPTION OF THE DRAWINGS

The invention will now be further described, by way of example, with reference to the accompanying drawings, in which.

DESCRIPTION OF THE PREFERRED EMBODIMENT

Figure 1:
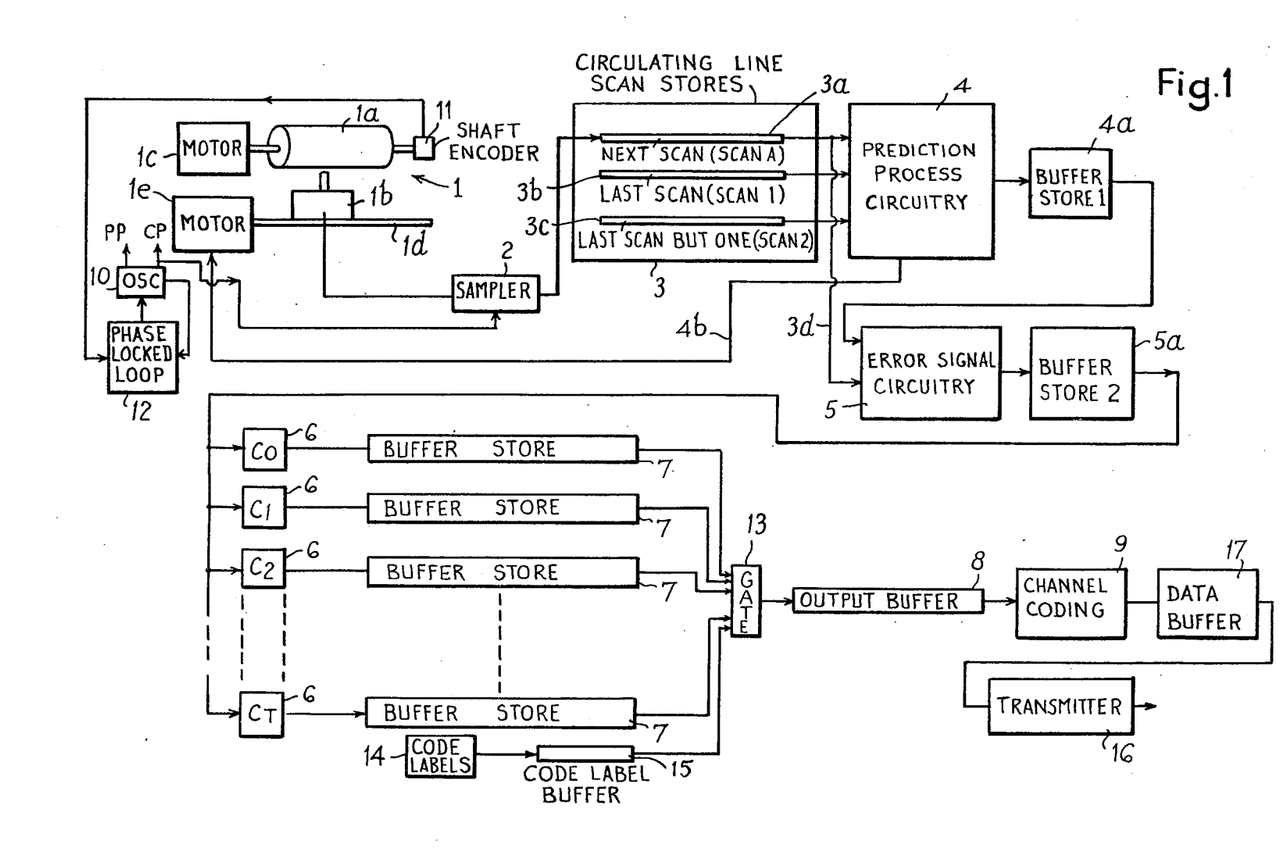
FIG. 1 is a block diagram of one embodiment of facsimile bandwidth compression system.

A block diagram of one embodiment of facsimile bandwidth compression system is illustrated in FIG. 1.

The system is capable of transmitting, in coded form, two level signals which are produced by the scanning of images, e.g., text or pictures, mounted on a facsimile scanner. As will become apparent from the following description, the system comprises three main parts.

1. The prediction process
2. Generation of an error signal
3. The adaptive coding process.

The coded signals produced are transmitted over a suitable transmission channel to a receiver.

Briefly, in FIG. 1, a facsimile scanner, generally indicated at 1, comprises a rotatable drum 1a on which is mounted the material to be scanned by a photo-electric scanning head 1b. The drum 1a is driven in rotation by a motor 1c and the scanning head 1b is mounted on a lead screw 1d driven by a motor 1e. The output signals from the scanning head 1b are fed to a sampler 2 controlled by clock pulses derived from an oscillator 10 functioning as a clock pulse generator. The oscillator is synchronised to the rotation of the facsimile drum 1a by means of the shaft encoder 11 driven by the drum and the phase locked loop 12.

The sampler 2 feeds the circulating line scan stores 3 and the output from these stores is applied to the prediction process circuitry 4. The "predicted next scan" signal produced by this circuitry is applied through buffer store 4a to an input of the error signal circuitry 5. This circuitry is also fed with an "actual next scan" signal over line 3d from the line scan store 3a. The prediction process circuitry 4 also produces a signal fed over line 4b to control the traverse motor 1e driving the lead screws 1d for the scanning head 1b. The error signal from circuitry 5 is fed through buffer store 5a to the inputs of parallel coders 6 each of which has its own output buffer store 7. The buffer stores 7 feed a gate 13 which is also fed with the labels for the different codes which are generated in a circuit 14 and fed via a buffer 15. The gate is connected to an output buffer 8 which feeds the transmitter 16. As shown, this may be done through channel coding equipment 9 and a data buffer 17.

The operation of the various parts of the system will now be described in greater detail.

1. The Prediction Process

In many scanning systems there is a significant amount of similarity between contiguous scans. In this embodiment it is therefore proposed that a number of contiguous scans (e.g., one or two or three or four or more, as required) are used to predict the next scan. The required number of contiguous scans are therefore input from the scanner 1, via the sampler 2, so that the two-level analogue signals from the scanner are transformed into two-level digital signals which are stored in a number of line-scan stores 3a to 3c, each store holding one scan. In such a two-level system, the prediction from any one scan most conveniently takes the form of the prediction of the positions of the black-to-white and white-to-black transitions in the next scan. Such a process corresponds to treating each scan as a sequence of black and white runs but the data could in principle be dealt with element by element, or in fixed block lengths, or in any other suitable form. The positions of the transitions in the next scan are predicted to lie on curves passing through the corresponding transitions on the contiguous scans used for the prediction process. The curve fitting procedure is to determine the coefficients of the lowest order polynomial that passes through the corresponding transitions on the required number of contiguous scans and to extrapolate the curve to the next scan. The process is illustrated for one, two and three contiguous scans in FIG. 2, and can obviously be extended indefinitely. In each case in this Figure $x$ represents the predicted scan and $x_1$, $x_2$ etc. the preceding scans from which the prediction is made. For the one line prediction process, (i.e., the zero order polynomial) the prediction implies that $x = x_1$. For the two line prediction process (i.e. the first order polynomial) the prediction implies that $x = 2x_1 - x_2$; whilst for the three line prediction process (i.e., the second order polynomial) the prediction implies that $x = 3x_1 - 3x_2 + x_3$; and so on.

There are a number of identifiable cases to be considered in which the above process must be modified in a systematic manner. Some of these cases are illustrated for the two-line prediction process in FIG. 3 (A to F) and similar cases can be identified for the three-line prediction process.

Figure 3:
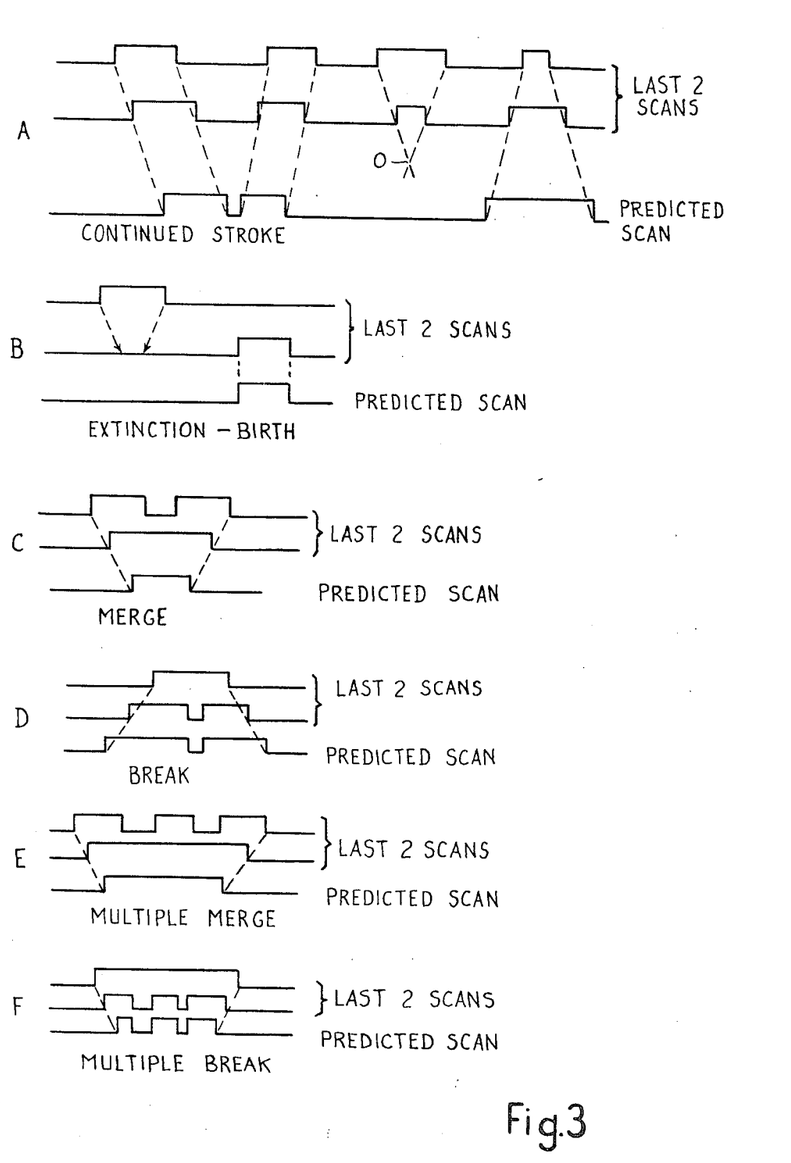

In FIG. 3, the CONTINUED STROKE case (A) indicates the curve fitting process (first order polynomial) for each of the pairs of corresponding transitions in the two contiguous scans. In the EXTINCTION case, (B) it illustrates the situation where a pair of transitions on the earlier scan are not matched by a pair of transitions on the later scan — the "run" has been extinguished. The reverse situation is also shown at (B) and labelled BIRTH.

The prediction processes illustrated for the MERGE case (c) and BREAK case (D) are self-explanatory, as are the MULTIPLE MERGE and MULTIPLE BREAK cases (E and F) shown in FIG. 3.

The number of identifiable cases is unlimited, but can be limited in any convenient, systematic and complete manner by breaking the more complicated cases down into suitable combinations of simpler cases.

A further modification must be included in order to deal with the situation in which the prediction process described above produces predicted transitions that would be placed out of sequence in the predicted scan to that of the corresponding transitions from which they were predicted. This is illustrated at 0 in the FIG. 3 CONTINUED STROKE case (A) in which the curve fitting lines are shown to intersect. The situation is handled by causing all predicted transitions to be compared, each with its successor, and by removing those that would be reproduced in the reverse order (or coincidently). The successor is also removed so that transitions are always removed in pairs. As mentioned above, the prediction process is carried out in the circuit block 4. (FIG. 1).

2. Generation of Error Signal

If the prediction process were always to predict the next scan exactly, then there would be no difference between the predicted scan and the actual next scan. In this case, there would be no need to send information to the receiver — for it would also be able to predict the next scan exactly, using the same number of contiguous scans, and the same prediction process as that used at the transmitter. However, the predicted scan will usually differ from the actual scan, and it is information concerning this difference, herein called the error signal, that must be transmitted for the receiver to be able to reconstruct the actual scan. The reconstruction process involves the prediction of the next scan, and the subsequent modification of it by the received difference or error signal. Thus the error signal is obtained in the circuit block 5, in a run-length form for convenience, from two scans; namely the predicted scan, and the actual scan. The comparison between two scans will again lead to a number of identifiable cases — in fact the same cases that occurred with the first order polynomial prediction process (i.e., for two contiguous scans) as shown again in FIG. 4. However, FIG. 4 differs from FIG. 3 in that for each case illustrated, the quantities required to determine the differences are shown since these quantities are included in the error signal. Thus, to produce the error signal for the case of CONTINUED STROKES case (A) it is necessary to transmit a code word to signify the case CONTINUED STROKES with the quantities plus a minus $l_1$, $l_2$. Other cases will be explained later.

As with the prediction process, the number of identifiable cases can be limited in a convenient and systematic manner. In this embodiment the number of cases is limited to those shown in FIG. 4. As can be seen from this figure the error signal generation involves a predicted signal and an actual signal. The origin of the predicted signal is not relevant to the error signal generation. It does not matter whether three contiguous scans were used to generate the predicted signal, or whether two or one or none were used — in fact the predicted signal could, in principle, be produced by other processes than those specifically described.

3. The Adaptive Coding Process

The error signal derived from the two processes so far described can be transmitted as a bandwidth reduced signal. Bandwidth reduction should result from the removal of the redundant information associated with the similarity of contiguous scan lines.

There is further redundant information in the signal associated with the statistical peculiarities of each scan line. A simple bandwidth compression system can be envisaged that exploits these statistical peculiarities alone.

A more comprehensive system however exploits both types of redundancy — the first two system parts exploit the first type of redundancy by using prediction followed by an error signal generation process — the third part exploits the second type of redundancy associated with the statistical peculiarities of the error signal.

The error signal (which in the limiting case could be regarded as the actual scan) has a statistical structure which can be treated by constructing a code matched to it. In the introduction, it was mentioned that many information sources could be regarded as being produced by a number of populations each with a different statistical structure. The virtue of this concept is that a compression system to handle such an information source can be constructed in which a number of different coders, each matched to one of the populations contributing to the source, can be supplied with the input signal, and the coded output from each can then be stored temporarily in a separate store.

The third part of the system therefore consists of a number of coders 6 with their inputs connected in parallel and fed with the error signal from the buffer store 5a; and with the output of each coder connected to its own buffer store 7. As the input data is processed, each of the coders will produce and store a coded version of the data. Generally, at least one of the coders will perform better — i.e., produce fewer coded output symbols — than the others. It will be the coder that is most closely matched to the statistical structure of the signal being handled at the time. If one particular coder performs better than all the others for a considerable period of time then its buffer store will eventually fill. The logic controlling the third part of the system is designed to recognise this condition and (i) cause the coders to stop operation, (ii) cause that particular buffer store to dump its contents into the output buffer 8, (iii) clear all coder buffers, and (iv) allow the resumption of the coding and buffer storage process. This sequence of events will repeat so long as the same coder maintains a superior performance to the others. However, if the nature of the input error signal were to change, so that its statistical structure changed either abruptly or gradually and another coder now proved more efficient, then control logic will cause the new coder buffer-store to be output, together with a unique coder word that identifies the subsequent coded output data as having originated from this new coder.

This sequence of events will be further described with reference to FIG. 5. Consider the two coders above, and call them $C_k$ for the first optimum coder and $C_j$ for the coder that subsequently becomes more efficient as a result of the change in the statistical structure of the input error signal. The number of output symbols stored by each coder might produce curves similar to those in FIG. 5, when plotted against the input symbols common to the two coders.

Figure 5:
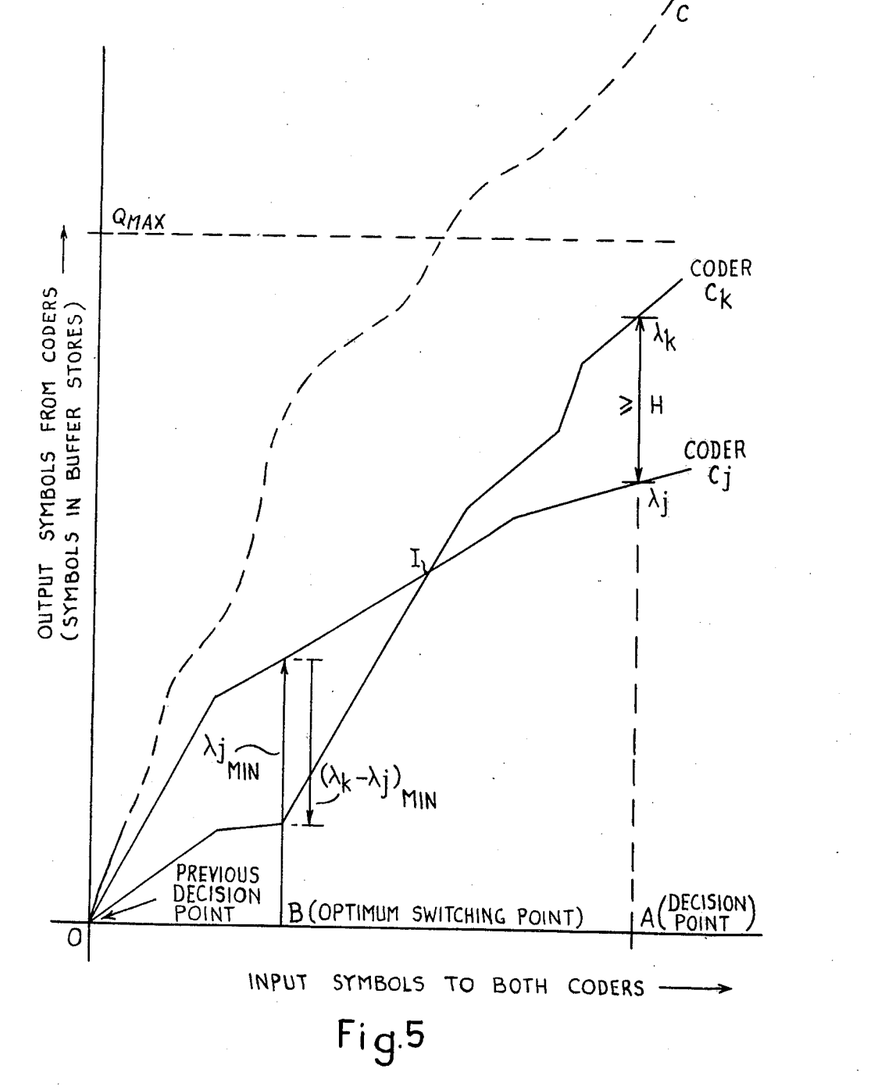
FIG. 5 is a graph illustrating the operation of the coding process.

For the initial considerable period in which $C_k$ maintains a superior performance to all others (including coder $C_j$) the Coder $C_k$ curve in FIG. 5 will increase monotonically until it reaches $Q_{max}$ corresponding to a full buffer store. All other coder curves will generally be above this curve (or perhaps at times a little below it), as indicated by the dotted line C. The recognition of the full buffer store of coder $C_k$ will lead to the sequence of events described above, including the clearance of all buffer stores. If at such time all the curves in FIG. 5 are moved down to intersect with the abscissa at the input symbol causing the $C_k$ buffer to become full, and the ordinate is also reset at this point, then FIG. 5 will also represent the number of symbols stored in the buffers at all times. The number of input symbols responsible for the state of fill of all stores will be given by the value of the abscissa.

When eventually coder $C_j$ becomes more efficient than coder $C_k$ their curves will cross as indicated at I in FIG. 5. Once the coder $C_j$ produces at least H fewer symbols than coder $C_k$, then it is deemed to be the better coder, where H is the number of symbols forming the label required to identify the new coder. It will be appreciated that this decision point will correspond to input symbol marked A on FIG. 5, and that the previous decision point is at 0, the origin of the diagram. In the present optimum code switching system, the input symbols from O to B are transmitted in code $C_k$, then the new code label is transmitted, and finally the input symbols from B to A are transmitted in code $C_j$.

In the present system there are transmitted $\lambda_{k\ min}$ symbols in code $C_k$, then H label symbols, and finally $(\lambda_k - \lambda_j)_{min}$ symbols in code $C_j$. This system is preferable to a non-optimum code switching one in which all the symbols are transmitted in the new code $C_j$, since the extra saving is $(\lambda_j - \lambda_k)_{min}$.

Thus the concept used is that when the decision is made at A that the new code $C_j$ is superior to code $C_k$ over the interval O to A by an amount required to compensate for the label of H symbols, then it is because it has become progressively superior over the interval O to A, notwithstanding the fact that at the last decision point O the decision had been taken that, in the previous interval, coder $C_k$ had been judged to be the best code to use. The most likely interpretation of this situation is that $C_k$ is superior to $C_j$ for a first part of the interval between decision points O to A and that $C_j$ is superior to $C_k$ for the remainder of the interval O to A.

It can easily be seen that the optimum point to switch between codes is when $(\lambda_k - \lambda_j)$ is a minimum. Generally, this minimum is negative as at B and a saving is achieved. In the worst situation the minimum is zero and B will coincide with O. Of course, it will be appreciated that a search for $(\lambda_k - \lambda_j)_{min}$ is required for all values of $j$. In the system being described, this search is carried out continuously as code words are transferred from each coder to its associated buffer store. For each of the parallel coders $j$, the value of $(\lambda_k - \lambda_j)$ is continuously monitored — not only in order to determine the decision point, but also to update all values of $(\lambda_k - \lambda_j)_{min}$ where appropriate. Here it is understood that the subscript $k$ refers to the code preferred at the last decision point, and that $j$ refers to all coders. It is also worth noting that the optimum point B for each code $C_j$ in relationship to code $C_k$ is different for each value of $j$. However, all such points B must be stored in order that the relevant one is available when a decision point such as A is reached. Furthermore, although there is a unique value of $\lambda_{j\ min}$ for each $j$, there is a different value for $\lambda_{k\ min}$ as understood from FIG. 5, i.e., $\lambda_{k\ min} = \lambda_{j\ min} + (\lambda_k - \lambda_j)_{min}$ for all values of $j$ and is different for different code curves $j$.

Moreover, in the present system a coding process has already taken place so that the input signal to the parallel coder 6 will already have undergone one stage of processing. The results of this prior processing will be an initial reduction of signal bandwidth. The adaptive coding process will be able to provide a further stage of bandwidth reduction provided that the parallel coders are designed to operate on a family of codes that are matched to the variety of populations whose statistical properties can be regarded as combining to provide signals of which the error signal input is a typical sample.

It is proposed that a Null coder be included in each family of codes on the basis that if a "non-typical" signal were to occur, then the system would perform at worst with no bandwidth compression. The Null coder is one in which the output is identical to the input.

A variation on the present system includes the use of a discriminant other than H for deciding that one coder is better than all others. This variation allows for the use of variable size discriminants that cater, for example, for the use of associated variable-length code labels.

Another variation allows the fixed discriminant of H between all codes to be increased to 2H for an escape from the Null code to any other code in order that the system can never be less efficient than that of no compression — this variation is of little significance for the optimum adaptive code switching system in which a non-negative saving is always made when code switching takes place.

In order to provide an even more efficient system, it is possible to increase the size of the buffer stores so that it is often the case that all coder outputs can be stored for more than one decision interval. Thus a decision to switch from code $C_k$ to code $C_j$ in the first interval can first be made, followed by a second decision to switch from code $C_j$ to code $C_i$ in the second interval. It is then possible that the switching point B (FIG. 5) for the second decision interval will exceptionally extend back into the first interval. Thus in the two intervals the following alternative situations, and others, can arise:

1) Interval 1: symbols in code $C_k$, then H symbols (code $C_j$ label), then symbols in code $C_j$.
   Interval 2: symbols in code $C_j$, then H symbols (code $C_i$ label), then symbols in code $C_i$

OR

2) Interval 1: symbols in code $C_k$, then H symbols (code $C_j$ label), then symbols in code $C_j$ label), then H symbols (code $C_i$ label), then symbol in code $C_i$.
   Interval 2: symbols in code $C_i$.

OR

3) Interval 1: symbols in code $C_k$, then H symbols (code $C_i$ label), then symbols in code $C_i$.
   Interval 2: symbols in code $C_i$.

This process can obviously be extended by sufficient storage to allow a number of decision intervals to be handled.

A more efficient use of buffer storage can be made if each coder buffer store 7 is not of the single input shift register variety as implied by the previous description but is of the circular buffer variety in which the input and output can be substantially independent in operation. This requires separately addressable input and output connections to the buffer. Since the input and output actions can now proceed independently, the timing requirements are substantially eased. There is no longer the need to stop the coders and wait for the contents of the required buffers to be shifted into the output buffer and cleared before the coder operation can be restarted — provided the buffer stores are neither completely filled nor emptied at any time. The output buffer store 8 may also be a circular buffer store.

A useful variation of the adaptive coding process is to use a number of coders, in which some coders are identical in operation except for differences in operating parameters; e.g., short fixed-length words can be used to code run-lengths up to a maximum value, whilst longer fixed-length words can be used to code run-lengths up to a greater maximum value. In this case a single coder can be used to represent all the coders of this type and the result can be stored in one buffer store. The decision process would have to cause the output of that store to be modified to conform with the chosen code when being shifted into the output buffer, but the saving in equipment can be considerable.

Reduction of Effect of Channel Errors

As shown in FIG. 1 it is intended that channel coding equipment 9 be used on the compressed signal in order to combat the effect of errors on the communication channel. This equipment could be incorporated into the bandwidth-compression equipment if required.

It is proposed that the effect of residual channel errors be minimised by causing the prediction process to be restarted at regular intervals — for example on every fourth or fifth scan line. This can be accomplished by causing the transmitter to arrange periodically for the actual scan line to replace the error signal and for the associated receiver periodically to deal with it as such. Similarly, each complete scan can be regarded as a number of equal-length segments so that errors within a scan segment do not propagate into adjacent segments. A preferred arrangement of these processes is for the restart of the prediction process to occur for individual segments instead of individual scans, and for the same number of segments to be restarted on every scan. For example, it would be possible to have ten segments per scan and to restart the prediction process for two of them on every scan — after ten scans each segment would have been restarted twice. This technique may reduce the system storage requirements.

Parallel Coders

Many types of known coders can be used as parallel coders. These include many varieties of run-length coders, the Shannon-Fano code, and the Huffman code. A particularly useful set of parallel coders might be considered for the coding of the raw scan when the prediction process is being restarted. The coders can be considered as a set of run-length coders used in a novel way. For example, the codes can each be formed of fixed word lengths, each length corresponding to a particular code. Whenever a particular code is being used, and the run-length being coded is too long to be coded with one code word, then two or more code words are used in combination. otherwise, one code word per run is sufficient. However, when coding two-level facsimile data, it is often the case that the black run-lengths are shorter than the white ones, or vice-versa. In this situation it is advantageous to use one code for the black runs and another for the white ones. The code words are sent in sequence, alternating with coded black and white runs. The interleaving of two codes does not prevent the determination of the decision and code changing points for the black code and white code separately. When either code is switched then the required code word label is inserted in the coded sequence at the appropriate point.

Figure 7:
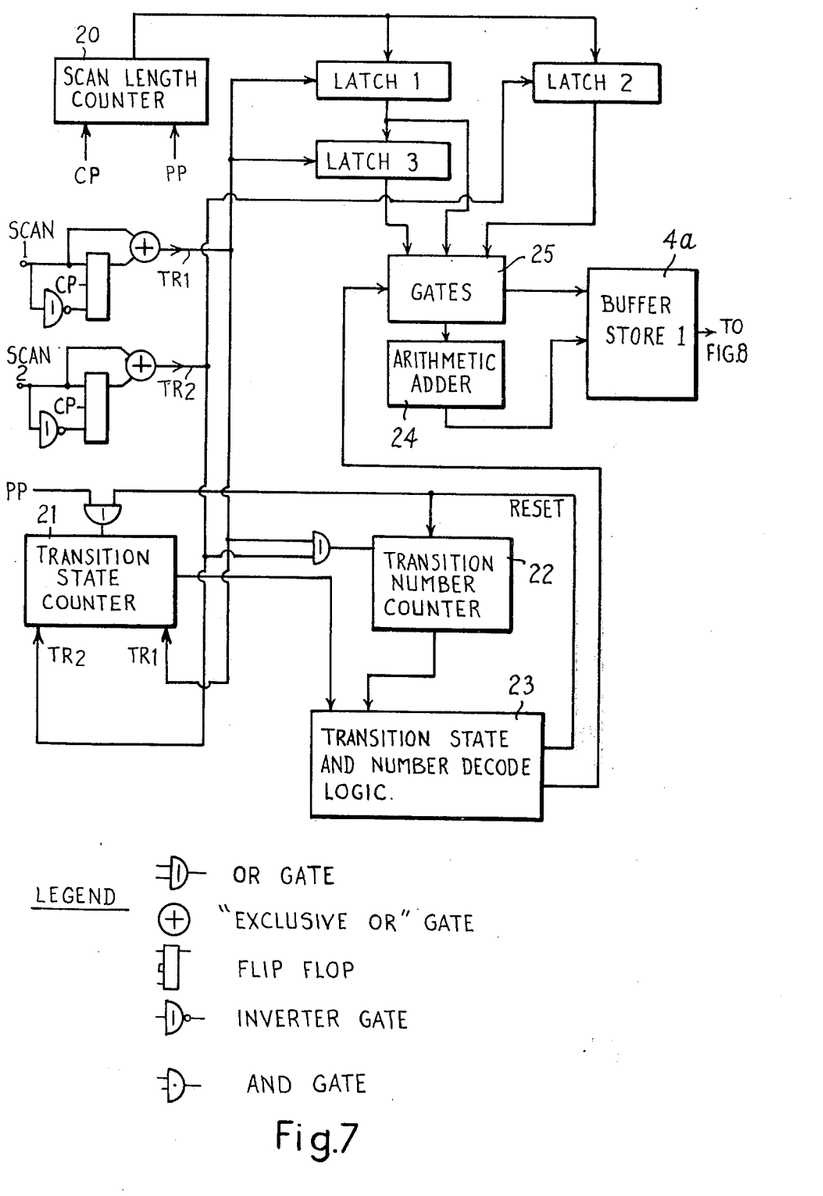
FIG. 7 is a block diagram of one embodiment of apparatus for carrying out the prediction process.
Figure 8:
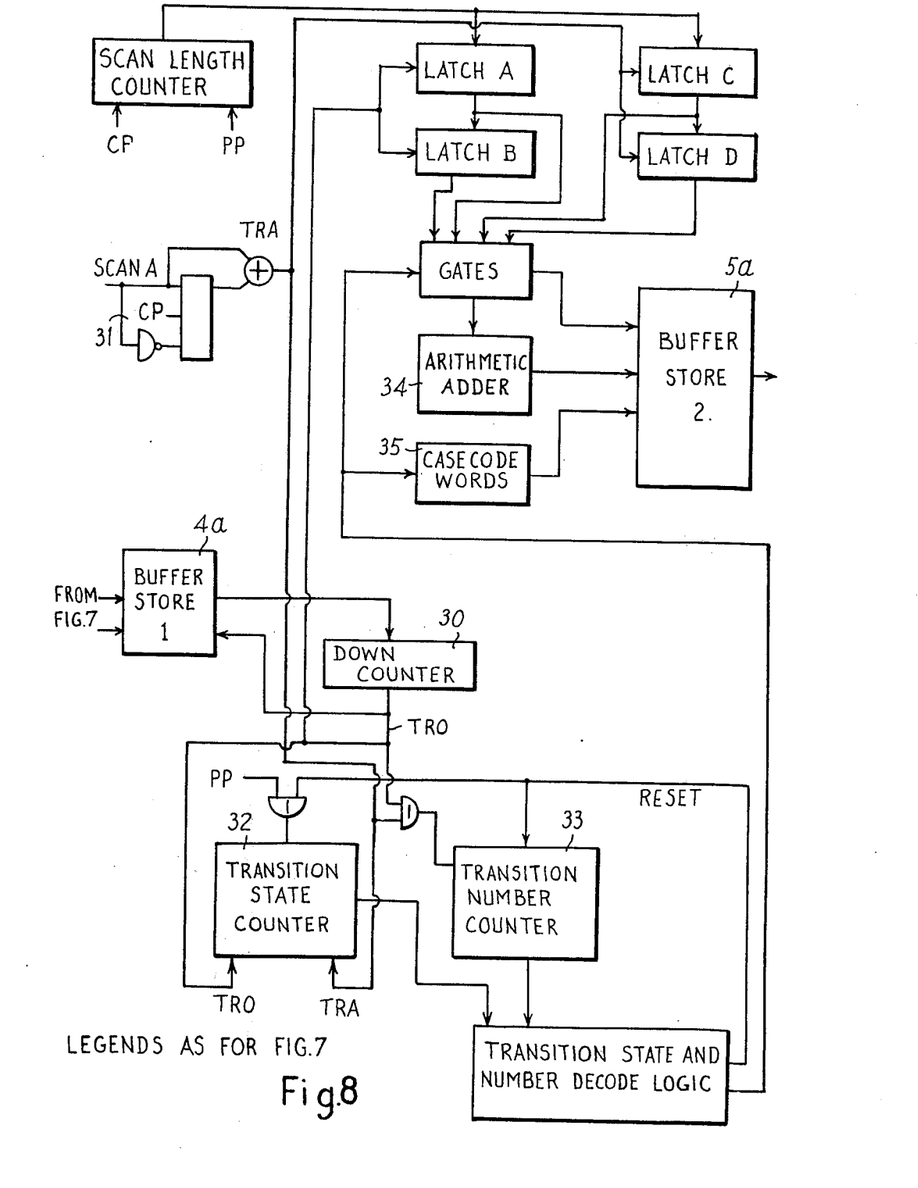
FIG. 8 is a block diagram of one embodiment of apparatus for generating the error signal.
Figure 9:
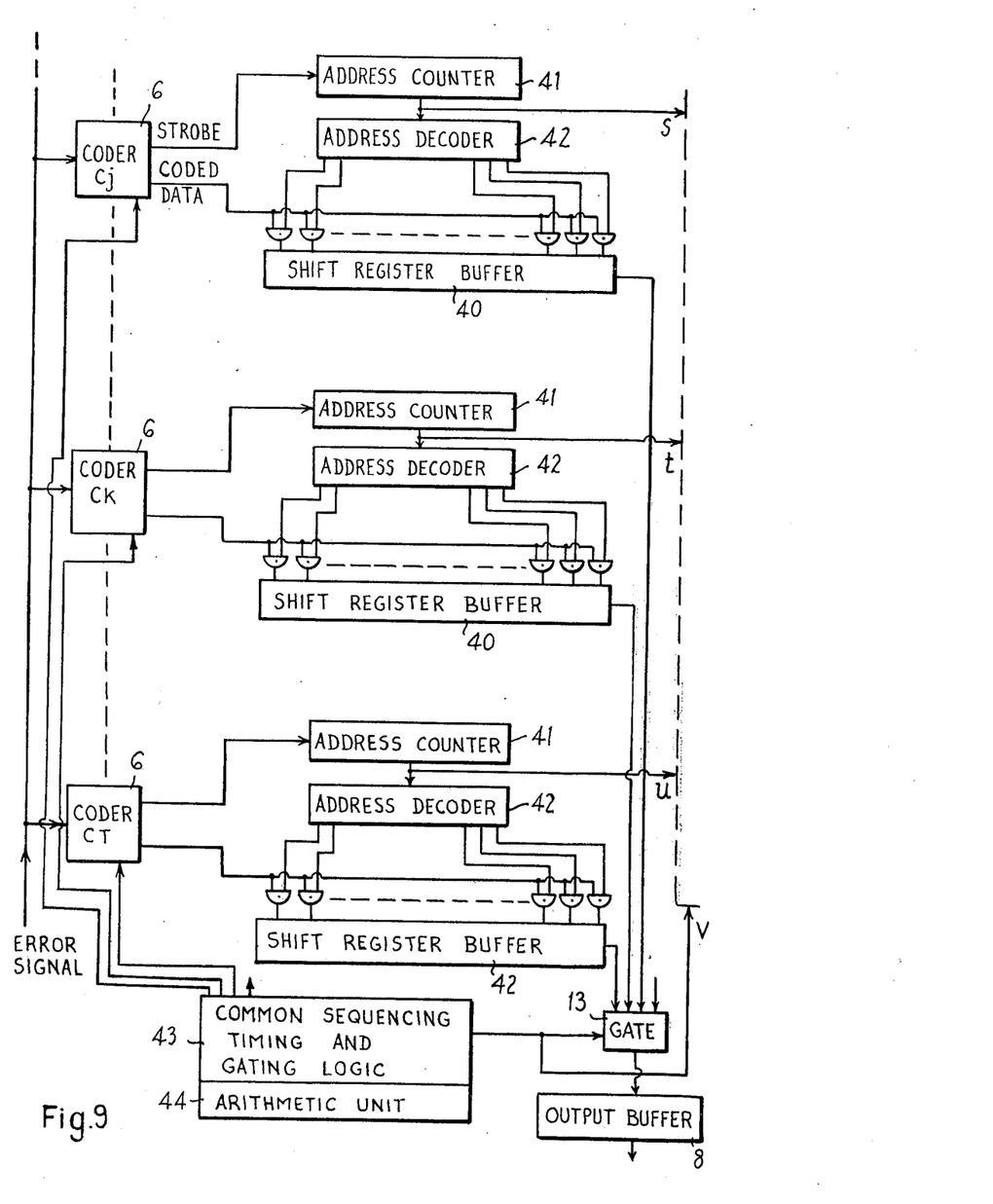
FIG. 9 is a block diagram of one embodiment of apparatus for carrying out the adaptive coding process.

Detailed circuitry will now be described with reference to FIGS. 7, 8 and 9, for carrying out the prediction process, the error signal generation and the coding process.

1. Prediction Process — FIG. 7.

A digital clock comprising oscillator 10 in FIG. 1 is locked to the facsimile transmitter drive electronics via the digital shaft encoder 11, so that the interval between successive clock pulses $C_p$ corresponds to a small fixed length of a scan obtained from the rotating facsimile drum 1a.

The position of the scanning head 1b along a scan line is obtained by means of the scan length counter 20 driven by the clock pulses $C_p$ and reset by the phase pulse PP. This counter is sufficiently large to hold a full scan count.

Figure 2:
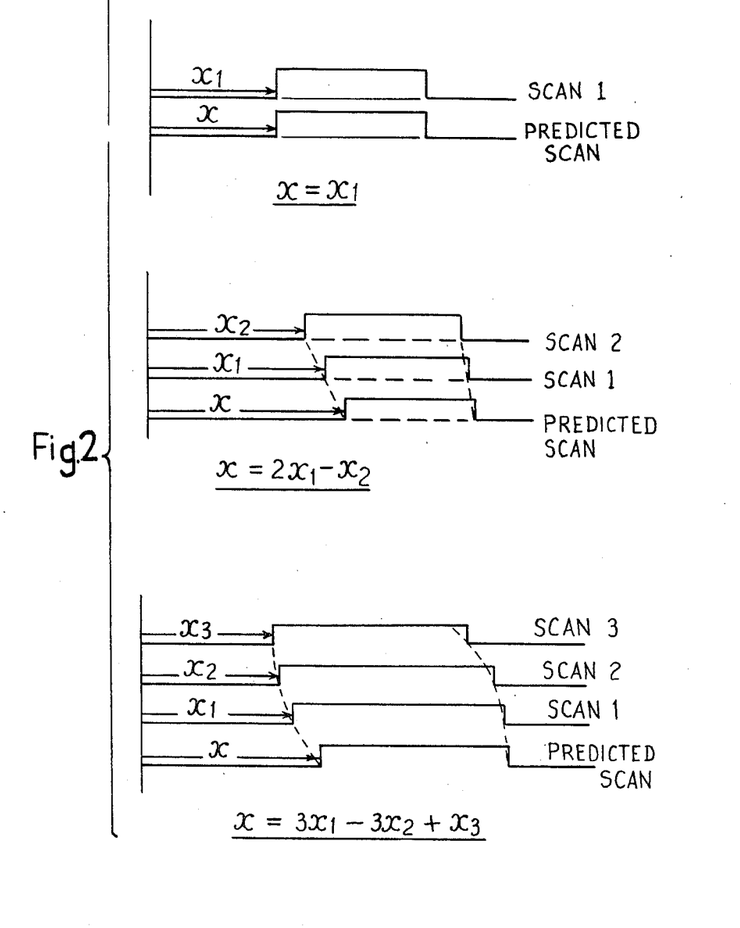
FIGS. 2 to 4 are explanatory diagrams illustraing the prediction process and error signal generation.

The prediction process using two previous scan lines held in circulating stores is as shown in FIG. 2. and requires the position of the black-to-white and white-to-black transitions on these scan lines, which are obtained by comparing each element in a scan line with the previous element to generate the signals TR1 and TR2.

As the facsimile drum 1a rotates, the occurrence of a transition on either of the two previous scans causes the current contents of the scan length counter 20 to be transferred to the corresponding bistable latch, either latch 1 or latch 2, for temporary storage until overwritten by subsequent counts. The latches comprise flip-flop circuits and each latch constitutes a multiple bit store. A third latch, latch 3, is also provided so that at all times latch 1 contains the position of the last occurring transition on scan 1 whilst latch 3 contains the position of the penultimate transition on scan 1.

The identifiable cases used to assist in the prediction process, and indicated in FIG. 3, are determined by means of a reversible, or "up-down", binary counter, namely the transition state counter 21, and a transition number counter 22. The counter 21 is decremented by one count whenever it receives a pulse on input TR1 corresponding to a transition on scan 1 (FIG. 2) and is incremented by one count whenever it receives a pulse on input TR2 corresponding to a transition on scan 2 (FIG. 2). The counter 22, however, is incremented by one count whenever it receives a pulse either on input TR1 or on input TR2.

Figure 6:
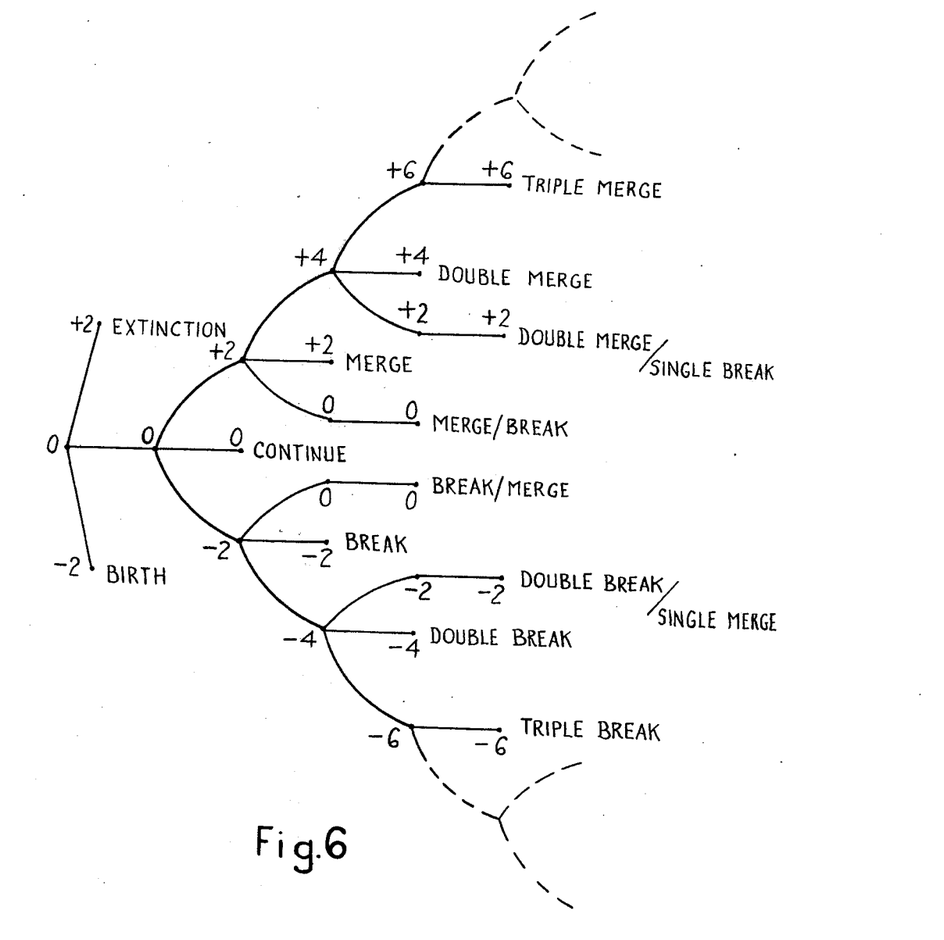
FIG. 6 is a state diagram.

An inspection of the identifiable cases illustrated in FIG. 3 shows that on every second transition associated with a prediction, the transition state counter 21 will progress through the states (or counts) indicated in FIG. 6. These states are recognised from the contents of the counters 21 and 22 by the transition state and number decode logic 23, consisting of combinations of logic circuits and a bistable circuit as well known to those skilled in the art, and outputs from this unit control the presentation of the correct combinations of the three latches to the arithmetic adder 24, via gates 25, in order to produce a sequence of binary numbers defining the predicted transition positions to buffer store 1 (buffer 4a in FIG. 1). The number of identifiable cases is deliberately limited to those for which there are at most six transitions, and more complicated cases are therefore broken up into combinations of these permitted cases. At the end of a successful determination and prediction for each case, the transition state counter 21 and the transition number counter 22 are reset so that they may be ready to repeat the process for the subsequent transitions occurring on scan 1 and scan 2.

The generation of the quantity $x = 2x_1 - x_2$, indicated in FIG. 2, for those cases requiring it (as shown in FIG. 3) is obtained by ensuring that the gates 25 controlled by the transition state and number decode logic 23 connect the complementary outputs of one latch and twice the output of a second latch to the arithmetic adder 24. Other combinations from the three latches required by the cases shown in FIG. 3 and controlled by the output from unit 23 are simply the contents of latches 1 and 3 as required. Each count from the arithmetic adder is compared with the previous count to ensure that it is greater than its predecessor before storing in buffer store 1. If the test fails then both counts are removed from the sequence of counts placed in that buffer. At the completion of each revolution of the facsimile drum, the scan prediction circuits of FIG. 7 will have placed a prediction of the next scan in buffer 4a (buffer store 1).

2. Generation of the "Error" Signal — FIG. 8

In the prediction process a number of contiguous scans are used to predict the next scan. It is conceivable that the predicted scan will be considerably different to the actual scan it was supposed to predict, and so there must be a certain amount of intermediate storage available in order that sufficient of the predicted scan will be available at all times for an adequate comparison between the two. It is just possible, but unlikely, that a complete line of predicted scan must be stored (or a complete segment when each scan is regarded as a number of equal length segments). Therefore buffer store 1 is provided as the intermediate storage media.

The error signal is obtained by comparing the predicted scan with the actual scan. For the reason stated the actual scan is delayed for one scan line period (or one segment period if desired) as shown in FIG. 1 before comparing with the predicted scan.

The predicted scan is reconstituted by generating a signal TRO (FIG. 8) which corresponds to the transitions occurring in the predicted scan as stored in buffer store 1. TRO is the "zero" decode of a down counter 30 which counts down the sequence of counts held in buffer store 1.

Figure 4:
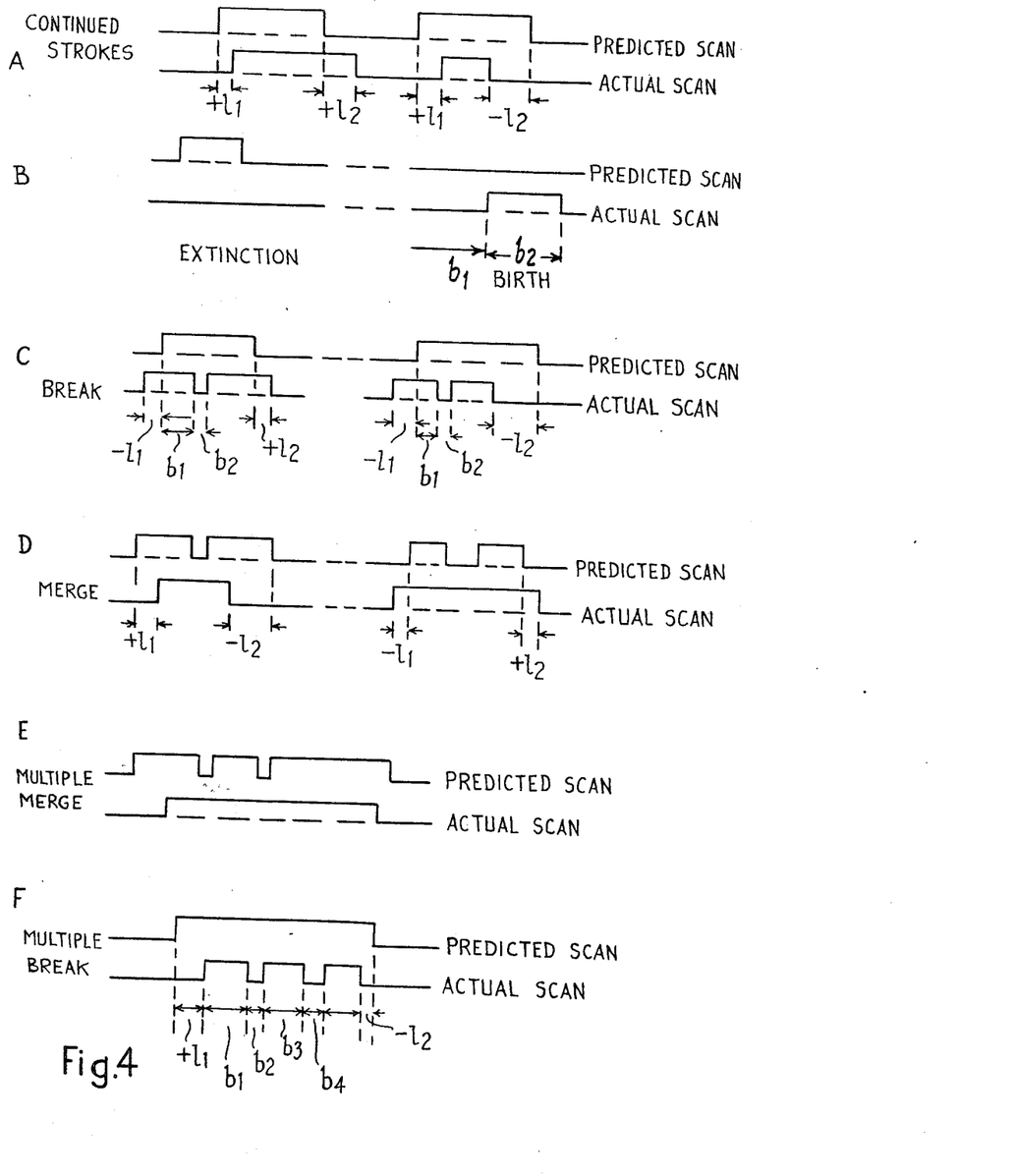

The error signal generation, being a comparison between two scans, requires the identification of a number of cases similar to those identified for the two-line prediction process. However, it must be remembered that although the prediction process can be carried out at both transmitter and receiver, the error signal generation process can only be carried out at the transmitter. The error signal is generated at the transmitter by comparing the predicted scan with the actual scan and the error signal is transmitted to the receiver. At the receiver, the error signal is combined with the predicted scan in order to reverse the process and thus obtain the actual scan. The actual scan (scan A) is used to produce a scan transition signal TRA in the circuit 31. A transition state counter 32 and a transition number counter 33 are used in a similar way to those in FIG. 7 in order to identify the cases relevant to the generation of the error signal data as indicated in FIG. 4. A set of eight identifiable cases is found to be suitable for the generation of the error signal.

The error signal for each case consists of a code word that identifies the case, plus coded quantities sufficient to enable the receiver to derive the actual signal from the predicted signal. The important cases are shown in FIG. 4 in which the coded quantities $l_1$, $l_2$ refer to the positional differences between actual transitions and the corresponding predicted transitions, and the coded quantities $b_1$, $b_2$, etc refer to the incremental positions of those actual transitions for which there are no corresponding predicted transitions.

The required error signals indicated in FIG. 4 for correcting the positions of the predicted transitions at the receiver are derived from the correct selection of scan length counts which are counted in the scan length counter 36 and stored in latch A, latch B, latch C and latch D for processing by the arithmetic adder 34 and insertion in sequence in buffer store 2 (buffer 5a in FIG. 1). Each of the latches constitues a multiple bit store.

A set of code words, one for each of the identifying cases is stored in the case code words unit 35. The appropriate word for each case identified by the circuitry described is selected for insertion in buffer store 2 immediately preceding the error signals derived from the arithmetic adder 35. Thus at the receiver, the decoder will at all times have sufficient data to enable it to identify the case from amongst those illustrated in FIG. 4 and to produce a copy of the actual scan from the local predicted scan.

3. Adaptive Coding Process — FIG. 9

The error signal data is extracted from buffer store 2, one word at a time and presented to the parallel coders $C_o, C_l...C_j...C_k...C_T$. The output from each coder is used to fill an associated shift register store 40 in a sequential manner with the assistance of an address counter 41 and an address decoder 42.

After the transfer of each coded word from a coder 6 to its associated shift register store 40, the contents of the coder address counter 41 are loaded into a first coder latch (i.e., latch J for coder $C_j$ and so on) of the adaptive coder store. Each latch constitutes a multiple bit store. Thus, the number of filled stages for each coder shift register buffer 40 is recorded for subsequent use by the common sequencing timing and gating logic 43 and its associated arithmetic unit 44. The logic internal structure of units 43 and 44 is based on conventional practices of digital circuit design well understood by those skilled in the art. Unit 43 is designed to produce timing and synchronising signals for controlling the feeding and monitoring of the coded error signal data and unit 44 is a conventional parallel adder/subtractor.

One of the coders, e.g. coder $C_k$, is treated as the preferred coder until the common logic determines, in the manner previously described, that another coder is to replace $C_k$ as the preferred coder. Three more latches are associated with each coder to enable the logic to switch between coders in an optimum manner under the control of signals V from unit 43.

When the address counter contents of the $C_j$ coder are transferred to a first latch latch J (i.e., when a coded word has been stored in the associated coder shift register buffer 40), the difference between the contents of the first latch of coder $C_k$, i.e., latch K, and latch J is stored in latch $(k\text{-}j)$. These quantities correspond to the ordinates (and ordinate differences) of the curves shown in FIG. 5. This process is repeated as successive coded words from each coder are transferred to the shift register buffers 40. In addition, the quantity to be stored in the third latch for each coder $C_j$, latch $(k\text{-}j)$, is compared with the previously stored minimum value of this quantity, held in latch $(k\text{-}j)$ min. If the new value constitutes a new minimum, then latch $(k\text{-}j)$ min is updated. Whenever this happens, so also the current value of the first latch, latch J is placed in the second latch, latch J min. By this means, the relevant quantities needed to execute the code switching process in an optimum manner are stored.

The common logic 43 checks that the contents of the third latch for each coder, e.g., latch $(k\text{-}j)$, never exceeds a threshold H. If the threshold is not exceeded, then as soon as the shift register buffer of the preferred coder $C_k$ is filled, its contents are transferred to the output buffer 8, all buffers are cleared and the process is restarted.

If however the threshold H is exceeded, then the common sequencing, timing and gating logic 43 causes the first portion of the preferred coder $C_k$ shift register buffer to output a quantity of data as defined by the contents of latch Kmin. Next a code label identifying the new code $C_j$ is output to the output buffer 8. And finally a second portion of the new coder shift register buffer is transferred to the output buffer. The portion is that defined by the counts held in latch J and latch Jmin. The shift register buffers are then cleared and the process is repeated.

Receiver

It will be obvious to those skilled in the art that the description of the transmitter system is sufficient to enable the construction of a receiving terminal. However, a brief description of the receiver will now be given.

The receiver consists of three main sections which correspond to the main parts of the system at the transmitter terminal.

1. Adaptive decoding process

The received signal is accepted by a small input buffer store of sufficient capacity for the adaptive decoding section to determine which of the parallel coders is in use at any time. Thus a corresponding decoder can be selected from a bank of parallel decoders and used to decode the incoming data. Each decoder will act in a complementary manner to the corresponding coder at the transmitter. This decoded data will be stored in a temporary store such as buffer store 2 in the transmitter terminal, and will correspond to the error signal generated at the transmitter.

2. Prediction process

The second section of the receiver terminal is identical to the prediction system in the transmitter terminal so that past received scans can be used to predict the next scan to be received. Thus the predicted scan is in all cases — except for channel errors that have already been discussed — identical to the predicted scan at the transmitter terminal.

3. Construction of "actual" signal

The predicted scan is combined with the decoded "error" signal and used to construct the actual scan that originally existed at the transmitter terminal.

Stepped Feed Process

At the transmitter and the receiver the compression and decompression processes are concerned with the conversion of a high speed flow of digital data to a lower one and vice versa.

In the case of mechanical facsimile drums the uncompressed data is presented to the compression equipment at a high fixed rate. The transmitter is required to compress this data to a smaller amount and pass it on to a communication channel at a lower fixed rate. These requirements mean that the desired compression remains fixed. However, the variable and unpredictable nature of the wide variety of possible input data means that the performance of any compressed system — however sophisticated or adaptive — will produce compression values that vary continuously from instant to instant. One means for dealing with this problem is to feed the output data from the transmitter terminal to a large data buffer store 17 (as shown in FIG. 1). Such a buffer store would need to store complete documents in compressed form — in the worst possible cases — and so would be an expensive system component. A similar store would be required at the receiving terminal.

This solution to the variable compression rates is likely to be of value in any "store-and-forward" communication system utilising bandwidth compression. Such a solution would also be valuable for networks of subscribers who might use common compression equipment and feed their data to and from it in uncompressed form. The virtue of this system is that the cost of the compression equipment is shared between users — and also that the subscribers could use conventional facsimile terminals.

However for point-to-point subscribers — especially those that use high speed facsimile equipment over wide-band circuits — it is desirable to avoid the use of large buffer stores and to solve this buffer problem by the use of a "stepped-feed" or "hesitation" feature at the facsimile terminals. This feature is indicated in FIG. 1 where it is seen that the motor 1e responsible for the traverse action of the scanning head 1b is controlled by a signal fed over line 4b from the circuitry 4 of the compression equipment. Thus, when the compression performance of the system is low, the input of data is stopped for an integral number of scans to allow the data congestion in the equipment to be eased. Once this has happened the scanning process is resumed.

The buffer store problem can be avoided in compression systems that do not use mechanical facsimile drums by varying the flow of data into the equipment as required. For example, in facsimile scanners using cathode ray tubes, the deflection circuits can employ ratchet scan or even variable velocity scan if desired. In compression systems in which the data is obtained from computer sources, the flow of data can also be easily controlled.

I claim:

1. Apparatus for code communication comprising:
a source of message symbols,
means for accepting successive message symbols from said source,
predicting means fed from said accepting means for predicting the positions of transitions of signal level in a following group of message symbols by using a polynomial curve-fitting procedure to fit polynomial curves to transitions of signal level in at least one preceding group of message symbols, said positions of transitions of signal level being predicted to lie on said curves fitted to said transitions,
means for generating an error signal corresponding to the difference between said following group of message symbols and the prediction of said following group of message symbols,
and means for coding the error signal for transmission to a receiving device.

2. Apparatus for code communication comprising:
a source of message symbols, said source comprising a facsimile scanner,
means for accepting successive message symbols from said source, and for providing successive groups of said successive message symbols comprising successive contiguous scans of data from said facsimile scanner,
predicting means fed from said accepting and providing means for predicting each symbol of a following group of message symbols from at least one preceding group of message symbols by predicting the positions of transitions of signal level in said following group of message symbols from the positions of transitions of signal level in said at least one preceding groups of message symbols,
means for generating an error signal corresponding to the difference between said following group of message symbols and the prediction of said following group of message symbols, and means for coding the error signal for transmission to a receiving device.

3. A method of code communication for a source of message symbols, comprising the steps of:
   accepting successive groups of message symbols from said source,
   predicting from said accepted groups the positions of transitions of signal level in a succeeding group of message symbols by using a polynomial curve fitting procedure to fit polynomial curves to transitions of signal level in at least one preceding group of message symbols, said positions of transitions of signal level being predicted to lie on said curves fitted to said transitions,
   generating an error signal corresponding to the difference between said succeeding group of message symbols and the prediction of said following group of message symbols,
   and coding the error signal for transmission to a receiving device.

* * * * *